L. W. DURST.
COMPRESSION GREASE CUP.
APPLICATION FILED MAR. 31, 1909.
936,872.
Patented Oct. 12, 1909.
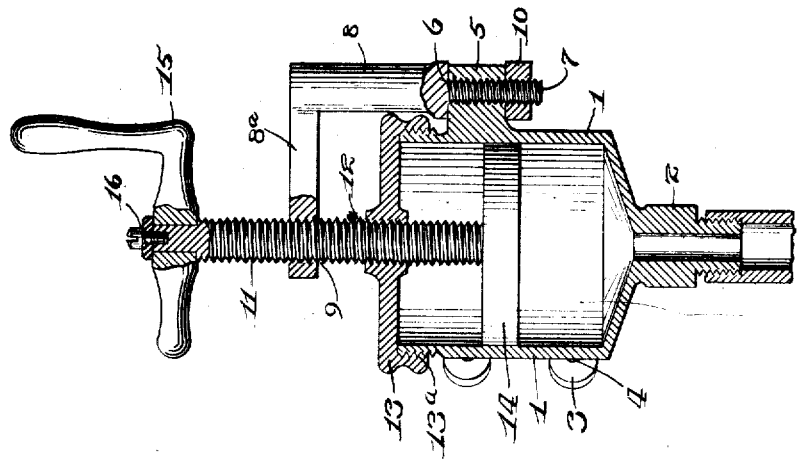
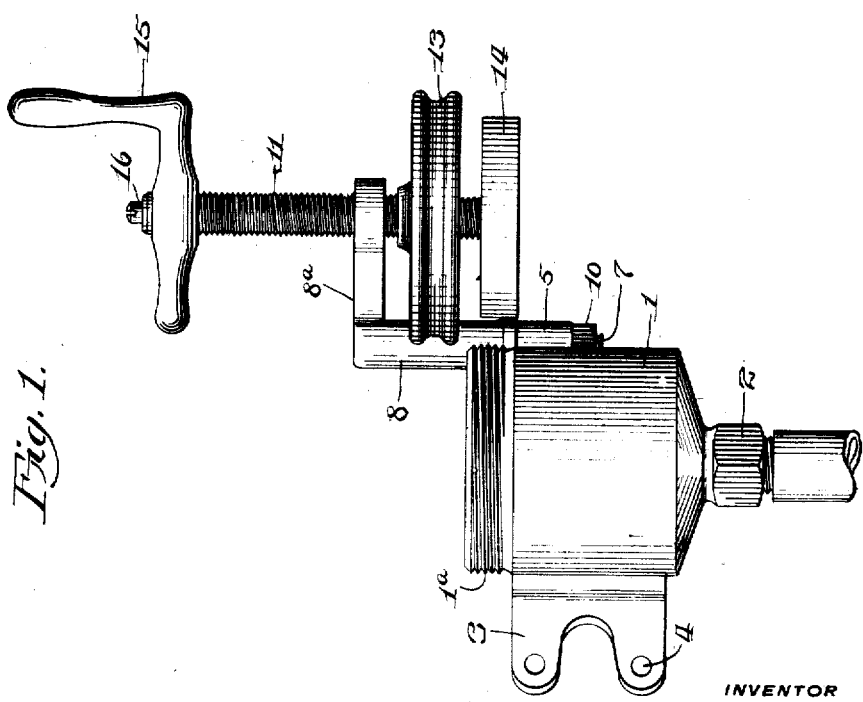
WITNESSES
INVENTOR
Louis W. Durst
BY
ATTORNEY

UNITED STATES PATENT OFFICE.

LOUIS W. DURST, OF PHILADELPHIA, PENNSYLVANIA.

COMPRESSION GREASE-CUP.

936,872. Specification of Letters Patent. Patented Oct. 12, 1909.

Application filed March 31, 1909. Serial No. 486,983.

*To all whom it may concern:*

Be it known that I, LOUIS W. DURST, a citizen of the United States, residing in the city of Philadelphia, State of Pennsylvania, have invented certain new and useful Improvements in Compression Grease-Cups, of which the following is a full, clear, and exact description, reference being had to the accompanying drawings, forming a part of this specification.

My invention relates to compression grease cups and has for its object the improvement of that type of such device to enable it to be detachably mounted directly on the connecting rod of an engine or other mechanical element to be lubricated, to eliminate the necessity for screw-threading the interior of the cup and the periphery of the plunger; and finally to pivotally connect the cap, compression screw and plunger, as a whole, with the cup and avoid the present necessity for physical detachment of the former from the latter when filling the cup.

To these ends my invention consists of the improved device hereinafter described, the novel features of which are pointed out in the appended claims.

In the accompanying drawings illustrating my invention, Figure 1 is a front elevation of the device with the pivoted cap, plunger and compression screw swung in their common pivotal bearing to open the cup, and Fig. 2 is a vertical section, partly in elevation, showing the device with the cup closed, and the cap and its adjunctive parts in operative position thereon.

Referring now to said drawings, 1 indicates a cylindrical cup or grease holder, with a depending hollow stem 2 for the delivery of liquid grease to the mechanical element to be lubricated. These parts are constructed as usual, save that the interior surface of the cup is not screw-threaded, but is smooth, and save also that there is cast upon the side of the cup a supporting or attaching bracket 3 in which a hole or holes 4 are formed to enable the device to be fastened by screws or otherwise to any fixed part of the engine or machine contiguous to the part to be lubricated.

On the opposite side of the cup 1 is cast a second bracket 5 which has a vertically-disposed screw-threaded recess 6 adapted to receive the screw-threaded end 7 of the swivel arm 8, 8ª, the latter extending inwardly and horizontally over the center of the cup, and with a screw-threaded recess 9 in line therewith. The threaded end 7 of the swivel arm is pivotally secured in the recess of the bracket 5 by a nut 10 or other suitable device.

Passing through the screw-threaded recess 9 of the part 8ª of the swivel arm, is a threaded compression rod 11, carrying on its end the plunger 14, and passing through the screw-threaded recess 12 in the center of the closing cap 13, which has a threaded flange 13ª engaging a thread 1ª on the peripheral edge of the cup.

It will be observed that the plunger element in my device has a perfectly smooth periphery and is not threaded, and also that threads on the inner surface of the cup are no longer employed because not necessary in my device. The top end of the compression screw has an operating handle 15, secured by screw pin and washer 16 or otherwise.

The operation of the device is as follows:—The cup being opened as shown in Fig. 1, by a suitable turning of the handle of the compression screw, the first effect is to draw the plunger up into the flanged cap, and then a continued turn raises the cap above the edge of the cup, and enables said parts to be swung to one side on the swivel arm. The cup being then filled with grease, the said parts are swung into operative or closed position, as shown in Fig. 2, the first turn of the compression screw being to seat the cap on the cup, and a continued turning depressing the plunger on the grease contents of the cup, driving the expressed liquid grease through the depending delivery pipe as usual. Aside from the advantage of maintaining the parts in physical connection, and the facility which results therefrom, in opening and closing the cup, a most decided advantage results from the avoidance of any necessity for threading the periphery of the plunger and the interior surface of the cup.

Having thus described my invention, I claim as new and desire to secure by Letters Patent:—

1. In a compression grease cup, the combination with a cylindrical cup having a basal outlet, a closing cap having a central threaded aperture, a plunger, a compression screw engaging said threaded aperture in the cap and operatively connecting said plunger and closing cap, of a bearing bracket on the periphery of the cup having a threaded vertical recess, and a swivel arm having a vertical member operatively mounted in said recess and a horizontal arm having a threaded recess with which the free end of said compression screw operatively engages.

2. The combination of an interiorly cylindrical cup having a basal tubular outlet, a flanged closing cap, there being a threaded connection between the flange of the cap and the peripheral edge of the cup, a plunger adapted to be reciprocated within the cup, a compression screw having one of its bearings in a threaded aperture in the flanged cap, a bracket on the periphery of the cup, and a swivel arm operatively mounted in said bracket and having a recess in its free end in vertical alinement with the free end of said compression screw.

3. The combination with an interiorly cylindrical cup having a basal outlet, a detachable closing cap having a central threaded aperture, a compression screw, a plunger carried by said screw, of means whereby the cap, plunger and screw may be brought into or out of operative alinement with the cup, said means consisting of a swivel arm having a threaded aperture in alinement with the threaded aperture in the cap, the free end of the screw engaging both of said threaded apertures, and a bearing bracket on the periphery of the cup having a threaded recess in which the opposite and threaded end of said swivel arm is operatively mounted.

4. The combination with a grease cup of the character recited, a detachable closing cap therefor, a plunger, a compression screw operatively connecting both cap and plunger and adapted to successively bring both said elements into and out of operative engagement with the cup, of a movable bearing for said screw, comprising a bearing bracket on the periphery of the cup and a swivel arm having a threaded end engaging said screw and an opposite end rotatably supported in said bracket, and means consisting of another bracket on the periphery of the cup adapted to detachably support the device as a whole.

In testimony whereof, I have hereunto affixed my signature this 30th day of March A. D. 1909.

LOUIS W. DURST.

Witnesses:
A. M. BIDDLE,
R. A. DUNLAP.